United States Patent
Eftekhari et al.

(10) Patent No.: US 11,768,304 B1
(45) Date of Patent: Sep. 26, 2023

(54) FRAMEWORK FOR MACHINE GUIDANCE

(71) Applicant: Intuit Inc., Mountain View, CA (US)

(72) Inventors: Amir R. Eftekhari, Lake Forest, CA (US); Roger C. Meike, Emerald Hills, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/958,278

(22) Filed: Sep. 30, 2022

(51) Int. Cl.
*H04N 21/44* (2011.01)
*G01V 1/32* (2006.01)

(52) U.S. Cl.
CPC ....... *G01V 1/325* (2013.01); *H04N 21/44008* (2013.01)

(58) Field of Classification Search
None
See application file for complete search history.

(56) References Cited

U.S. PATENT DOCUMENTS

| | | | |
|---|---|---|---|
| 2022/0028524 A1* | 1/2022 | Levi | G06T 7/10 |
| 2023/0122345 A1* | 4/2023 | Blume | G06F 3/0484 715/722 |

\* cited by examiner

*Primary Examiner* — Cai Y Chen
(74) *Attorney, Agent, or Firm* — Ferguson Braswell Fraser Kubasta PC

(57) ABSTRACT

A method includes receiving a data stream comprising content generated by an application executing on a user device. The data stream is received from a guidance service that is separate from the application. The data stream is processed using a set of machine learning models to identify a first set of artifacts within the content. A first state of the application is identified based on the first set of artifacts. First transition data is identified in a logic flow of the application. The first transition data corresponds to transitioning from the first state to a second state of the application. Based on the first transition data, first guidance data is generated that describes user input for transitioning the application from the first state to the second state. The first guidance data is sent to the user device, where it is separately presented from the application by the guidance service.

20 Claims, 5 Drawing Sheets

Input
302

Convolution Layers
304

Fully Connected Layers
306

FRAMEWORK FOR MACHINE GUIDANCE

BACKGROUND

Video conferencing solutions connect users at two or more sites (i.e., physical locations). Users may communicate with each other with videotelephony applications using live real-time video and audio in a multimedia stream.

In a video conferencing system, users have an option of sharing content through screen sharing. For example, a user may share a file or an entire screen. The screen share may enable collaboration among users while each user views the file or screen.

SUMMARY

In general, in one aspect, one or more embodiments related to a method. The method includes receiving a data stream comprising content generated by an application executing on a user device. The data stream is received from a guidance service that is separate from the application, and processing the data stream using a set of machine learning models to identify a first set of artifacts within the content. The method further includes identifying a first state of the application based on the first set of artifacts. The method also includes identifying first transition data in a logic flow of the application. The first transition data corresponds to transitioning from the first state to a second state of the application. The method further includes generating, based on the first transition data, first guidance data that describes user input that transitions the application from the first state to the second state. The method also includes sending the first guidance data to the user device. The first guidance data is separately presented from the application by the guidance service.

In general, in one aspect, one or more embodiments related to a system that includes a computer processor, memory, and instructions stored in the memory. The instructions are executable by the computer processor to cause the computer processor to perform a method. The method includes receiving a data stream comprising content generated by of an application executing on a user device. The data stream is received from a guidance service that is separate from the application; processing the data stream using a set of machine learning models to identify a first set of artifacts within the content. The method further includes identifying a first state of the application based on the first set of artifacts. The method also includes identifying first transition data in a logic flow of the application. The first transition data corresponds to transitioning from the first state to a second state of the application. The method further includes generating, based on the first transition data, first guidance data that describes user input that transitions the application from the first state to the second state. The method also includes sending the first guidance data to the user device. The first guidance data is separately presented from the application by the guidance service.

In general, in one aspect, one or more embodiments related to a computer program product comprising non-transitory computer-readable program code that, when executed by a computer processor of a computing system, cause the computing system to perform a method. The method includes receiving a data stream comprising content generated by an application executing on a user device. The data stream is received from a guidance service that is separate from the application; processing the data stream using a set of machine learning models to identify a first set of artifacts within the content. The method further includes identifying a first state of the application based on the first set of artifacts. The method also includes identifying first transition data in a logic flow of the application. The first transition data corresponds to transitioning from the first state to a second state of the application. The method further includes generating, based on the first transition data, first guidance data that describes user input that transitions the application from the first state to the second state. The method also includes sending the first guidance data to the user device. The first guidance data is separately presented from the application by the guidance service.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to a method, computer program product, and system that provides a framework for machine guidance during screenshare. This invention enables the machine to guide a user to accomplish a task via screenshare. The machine joins the meeting and asks the user to share their screen using commands delivered in natural language using text-to-speech technology. Once the customer shares their screen, the machine will provide a series of instructions, again via text-to-speech audio, on how to navigate to a desired destination on a web page or a mobile app. Once the destination is reached, a desired finishing action, such as a download or save of a file or a click-to-accept some action, is again requested over text-to-speech audio.

Generally, the process works by instructing the user to take an initial action to baseline the home location of the information shared on the screen. Using technologies such as optical character recognition (OCR), artificial intelligence computer vision, or image recognition, the machine observes and identifies virtual artifacts displayed on the user's screen. The machine compares the artifacts against a state machine that the machine keeps internally to help navigate the user to a desired outcome. If the artifacts match the current index in the state machine, the user is instructed to take the next desired action as outlined in the state machine. These voice instructions are delivered using text-to-speech technology over the same meeting channel the user is on.

If the user takes an unexpected action, the user will be instructed to return back to the previous step. Alternatively, if the deviated location produces artifacts that can be matched against the state machine, then the instructions can be more specific. For example, if the user navigates incorrectly and the state machine has data to recognize the incorrect path, then specific steps can be provided that describes the navigation to the desired path. Otherwise, a more general instruction can be issued to request returning to the previous location.

Once the user navigates to the final node in the state machine, the instructions will be provided. At this point, the goal is achieved and the machine is successful in navigating the user.

Figure 1:
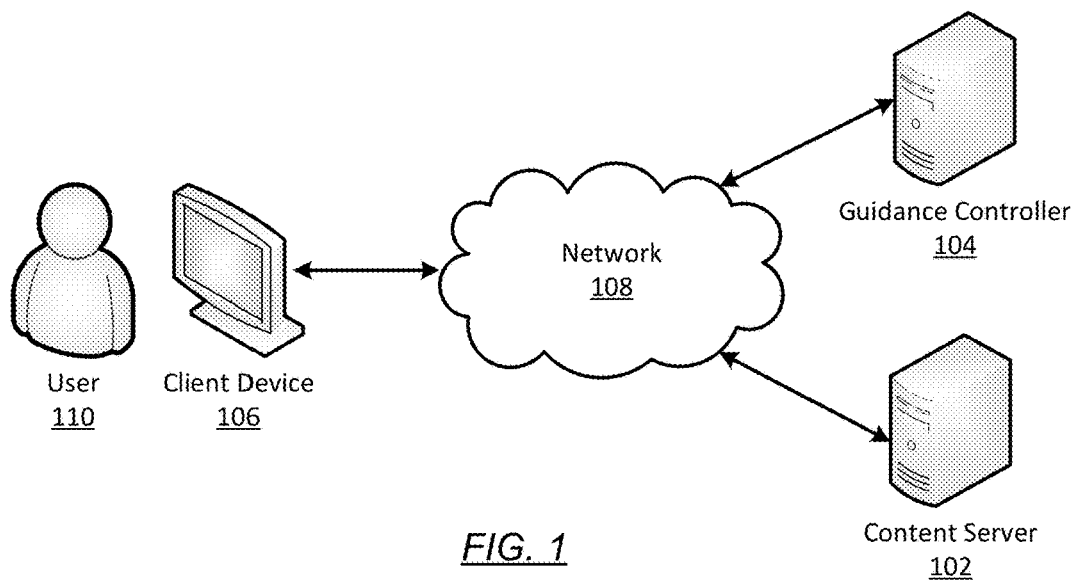
FIG. 1 illustrates an example data processing environment ("environment") (100) in accordance with the disclosed embodiments.

Turning now to the figures, FIG. 1 illustrates an example data processing environment ("environment") (100) in accordance with the disclosed embodiments. In some embodiments, the environment (100) can include a content server (102), a guidance controller (104), and one or more client devices (106) communicatively coupled to one another by way of network (108). The client device (106) may be used or otherwise accessed by a user (110).

The content server (102) is a computing system in accordance with those described in FIGS. 6.1 and 6.2, and, in one or more embodiments, may be any type of endpoint to be reached by the client device (106). For example, the content server may host webpages, applications, or streaming content that are accessible using the client device (106). The content server (102) may host an application that provides a shared environment for collaborative communication between the client devices (106). A shared environment is a virtual environment that is shared or otherwise used concurrently by two or more entities via the client devices that are remote from each other. The entities may be one or more end users and the machine. The collaborative communication is content that the client devices may communicate via voice, video and/or text live during a conference. For example, the content server may host online web conferencing, virtual worlds, virtual environments, or Web Real Time Communications (WebRTC).

Figure 6A:
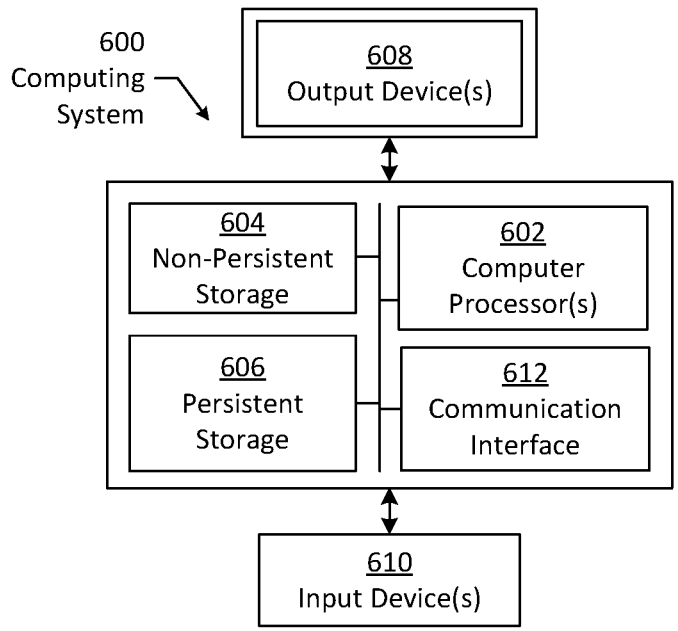
FIGS. 6A-6B shows a computing system in accordance with one or more embodiments of the invention.
Figure 6B:
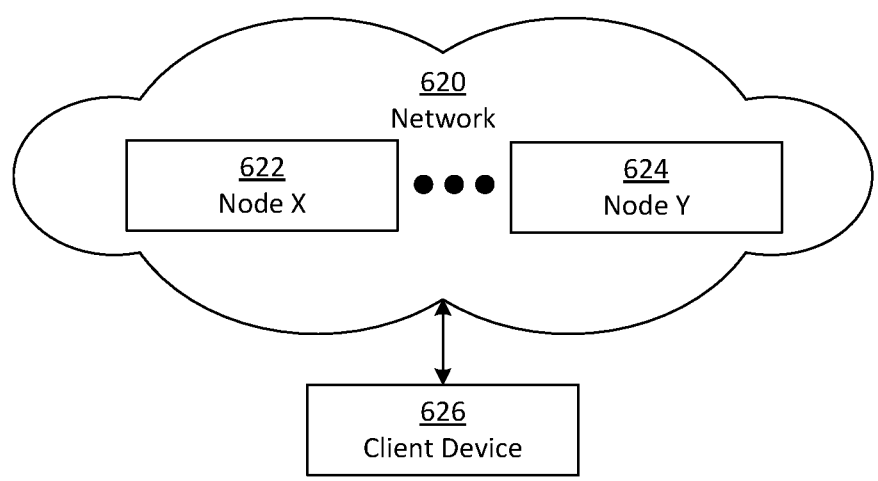

The guidance controller (104) is a set of programs stored in the memory of a computing system in accordance with those described in FIGS. 6A and 6B, and, for example, may be hosted by a server in a cloud computing environment. As described in FIG. 2, the guidance controller (104) includes functionality for monitoring a data stream from the client device (106), and analyzing the content of the data stream to determine a state of applications executing on the client device (106). The guidance controller (104) includes functionality for generating guidance for presentation on the client device to transition the applications to a desired state.

The client device (106) can be any variety of electronic devices capable of consuming, providing, and/or rendering data communicated across the network (108). For example, a client device (106) can include one or more computer systems similar to that of the computer system (600) described below with regard to at least FIG. 6.

Client device (106) can include one or more applications that can be used to request content, to provide content, to render content, and/or to send and/or receive requests to and/or from other devices via the network (108). For example, a client device (106) may include an Internet browser application a virtual world client application, or a web conferencing client application. These applications may facilitate communication with servers, such as the content server (102), and/or other client devices (106).

Figure 2:
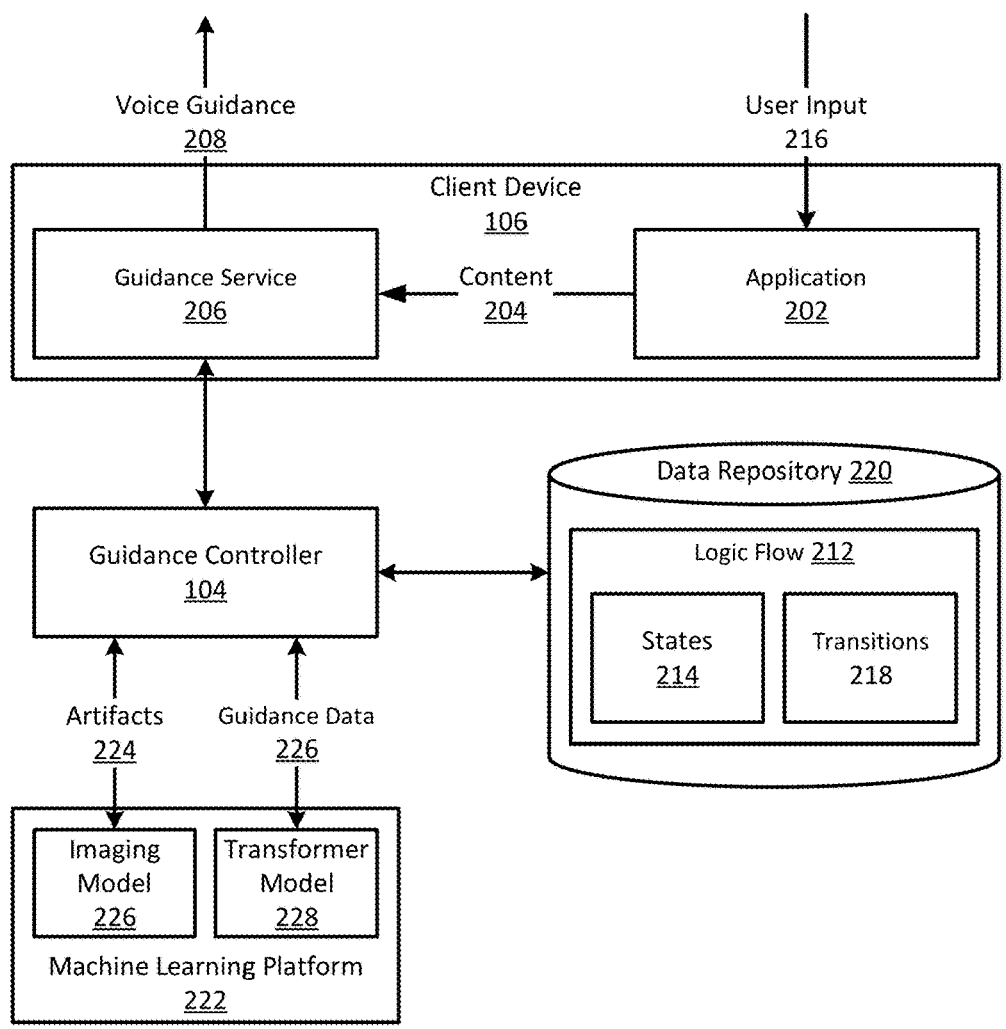
FIG. 2 shows a schematic diagram of additional system components of the environment 100 shown in FIG. 1, in accordance with one or more embodiments.

FIG. 2 shows a schematic diagram of additional system components of the environment (100) shown in FIG. 1, in accordance with one or more embodiments. The application (202) executing on client device (106) can be a client application to a shared virtual environment, such as online web conferencing, virtual worlds, virtual environments, or Web Real Time Communications (WebRTC).

The application (202) may include a user interface (UI) (not shown) for receiving user input (216) from a user and transmitting output to the user. For example, the UI may be a graphical user interface or other user interface, such as a gesture interface for voice interface.

The UI may be rendered and displayed within a local desktop software application or the UI may be generated by a remote web server and transmitted to a user's web browser executing locally on a desktop or mobile device. For example, the UI may be an interface of application (202) providing the functionality to the user (e.g., a local gaming application, a word processing application, a financial management application, network management application, business management application etc.).

In one or more embodiments, a guidance service (206) runs as a background process or daemon that is separate from the application (202). The guidance service (206) monitors application (202), and provides voice guidance (208) to a user for performing tasks in the application. For example, the guidance service (206) may monitor content (204) generated by application (202), encoding the content (204) in a data stream for sharing to the guidance controller (104).

As used herein, a "data stream" is a sequence of digitally encoded coherent signals used to transmit or receive content (204) generated by application in (202). The content (204) can come from a number of data sources, including a display screen, external devices and virtual environments, or other sources. For example, the content (204) may be the video received during a live conference call. In other examples, the content (204) can include 2D images from a screenshare, stereoscopic three-dimensional (3D) images from a diagnostic device, such as an ultrasound or magnetic resonance imaging, 3D content from an online virtual environment (i.e., a metaverse), and/or multi-dimensional data shared from remote analytical instrumentation, such as a mass spectrometer.

For example, the application (202) can be a web conferencing application that establishes and controls a conference call or online meetings. Example conferencing applications include Zoom application by Zoom Video Communications, Inc. located in San Jose, California, Microsoft Teams® application developed by Microsoft Corporation, located in Redmond, Washington, WebEx® application developed by Cisco Corporation, located in San Francisco, California, or other meeting software applications.

In this illustrative example, the application (202) includes functionality to share content being displayed on a local user's screen with the remote client devices (i.e., conference endpoints). This sharing of content may be referred to as a "screen share," and may include an entire display screen or portion thereof. The content being shared may an entire display screen (e.g., the various applications being displayed) or a portion of the display screen, such as a portion of single file being displayed. The application may share content (204) as a stream of images for display on the remote conferencing endpoints.

In one or more embodiments, the guidance service (206) can run on client device (106). In other illustrative examples, the guidance service (206) can be distributed in multiple locations across a network. For example, the guidance service (206) can run on client device (106) and as a cloud-based service in conjunction with guidance controller (104), depending on the particular implementation.

In one or more embodiments of the invention, the guidance controller (104) models the execution of application (202) as a logic flow (212). The logic flow (212) is a data structure that includes multiple states (214) that may be transitioned between based on user input (216) received by the application (202). The transitions (218) may identify data that is used to proceed from one state to a different state.

The logic flow (212) may be stored in data repository (220). In one or more embodiments of the invention, the data repository (220) is any type of storage unit and/or device (e.g., a file system, database, data structure, or any other storage mechanism) for storing data. Further, the data repository (220) may include multiple different, potentially heterogeneous, storage units and/or devices.

Machine learning platform (222) includes one or more machine learning models for processing content (204) to identify artifacts (224). As used herein, an "artifact" is an object represented within a digital environment of the application (202).

The machine learning platform (222) may include additional machine learning models. For example, the machine learning platform (222) may include models for classifying the identified artifacts to determine one or more states (214) of the application (202) within logic flow (212). The machine learning platform (222) may additionally include models for generating voice guidance (208).

For example, an imaging model (226) may be used to perform optical character recognition (OCR) on content (204), converting the images to machine encoded text. OCR models may be configured to tokenize identified content of the document using a tokenization process. For example, an OCR engine may identify individual characters from the document and then apply the tokenization process to group the individual characters into words or terms. The tokenization process may convert the characters into token values. The token values may be useful semantic units for further processing. The tokenization is performed by locating word boundaries (e.g., ending point of a word and beginning point of the next word) in a piece of text. In some examples, the tokenization process may discard certain characters (e.g., punctuation, etc.).

In this example, the output of the imaging model (226) may include artifacts (224), such as text and layout of the images displayed by application the (202). The text includes the token values and information about the location of the token values in the document image. The layout includes the bounding boxes around different portions of the document image.

The imaging model (226) may be used to perform object recognition and classification on content (204). For example, the imaging model may be a trained convolutional neural network (CNN) model that is trained to identify artifacts (224) that are present in content (204). An example of a CNN model architecture that may be used is MobileNet-v2. Other CNN architectures may be used without departing from the scope of the invention. In one or more embodiments, the output of a fully connected layer of the CNN is an image feature vector that can be used for indexing and searching states (214).

In this example, the output of the imaging model (226) may include artifacts (224), such as real-world objects, and components thereof, that are imaged by the application (202) for video monitoring. For example, if a user desires help repairing an engine, the imaging model (226) may identify individual components of the engine, such as a bolt.

Other models may implement a transformer model architecture. A transformer includes one or more encoder blocks coupled with one or more decoder blocks. An output of an encoder block may be an input to one or more decoder blocks. A decoder block may perform a downstream task (for example, text generation). For example, a transformer model (228) may be used to generate guidance data (226). Guidance data (226) is data describes user input for transitioning the application (202) between states (214). The guidance data (226) can be delivered to a user as voice guidance (208) using text-to-speech technology.

Although FIGS. 1 and 2 shows certain components as being part of the client device (106), some components may be part of a different system as remote components. For example, at least a portion of the storage may optionally be remote storage. As another example, the guidance service (206) and/or application (202) may execute on separate remote machines. In such a scenario, the guidance service (206) running on one client device may monitor a screen share of the application (202) on a second client device. To the remote endpoints, the configuration and data structures of the application's remote instance may be hidden. Each of the different possible configurations of the conferencing endpoint may be used without departing from the scope of the disclosure.

Figure 3A:
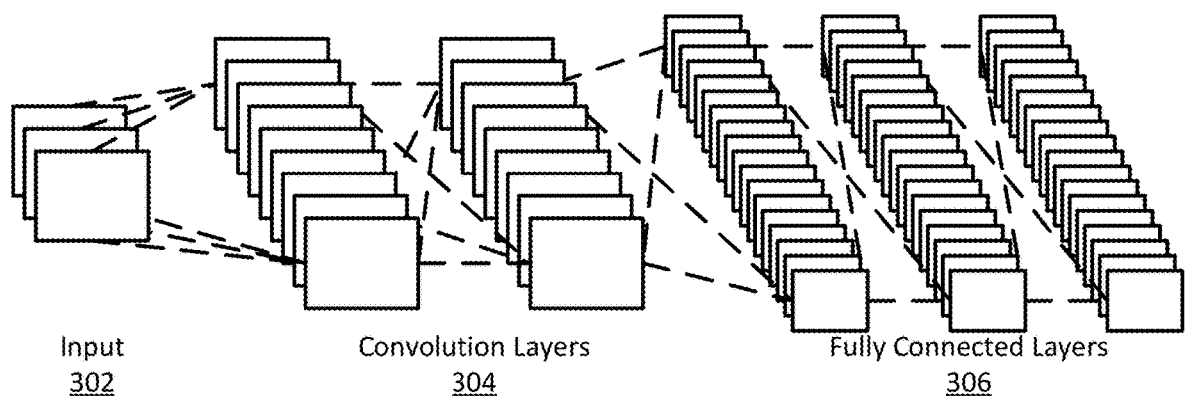
FIGS. 3A-3B illustrate a convolutional neural network, in accordance with one or more embodiments.
Figure 3B:
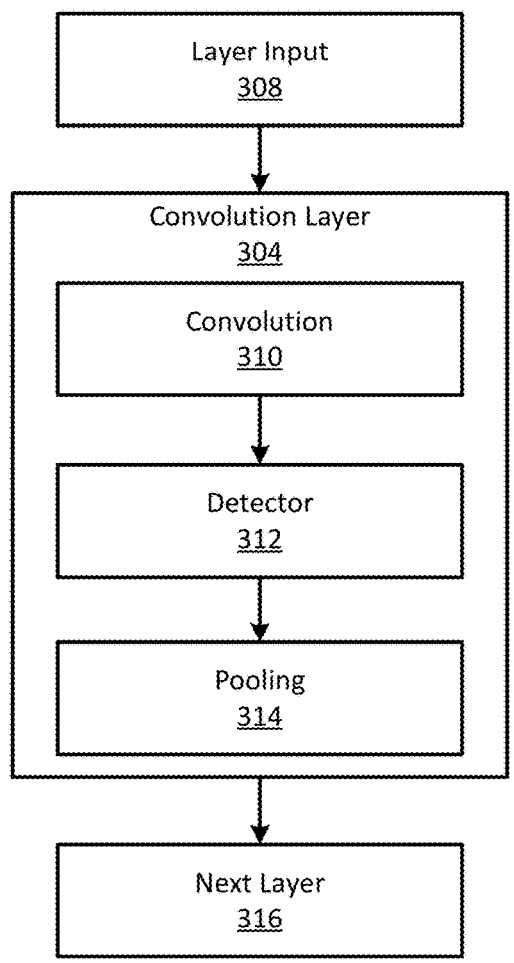

FIG. 3A-3B illustrate an exemplary convolutional neural network. The architecture illustrated in figure three can be used to implement one or more machine learning models, such as imaging model (226) of FIG. 2. A CNN is a specialized feedforward neural network for processing data having a known, grid-like topology, such as image data. The nodes in the CNN input layer are organized into a set of "filters." A convolution mathematical operation is applied at each filter to produce an output that is propagated to nodes in successive layers of the network.

FIG. 3A illustrates various layers within a CNN. As shown in FIG. 3A, an exemplary CNN used to model image processing can receive input (302) describing the red, green, and blue (RGB) components of an input image. The input (302) can be processed by multiple convolutional layers (304). The convolutional layers are sparsely connected; instead of inputting the respective state value of each of the nodes, input to subsequent nodes is the output from the previous convolution. Kernels associated with the convolutional layers perform convolution operations, reducing dimensionality and enabling the CNN to scale for large image processing.

FIG. 3B illustrates exemplary computation stages within a convolutional layer of a CNN. Input (308) to a convolutional layer (304) of a CNN can be processed in three stages, including a convolution stage (310), a detector stage (312), and a pooling stage (314).

The convolution stage (310) can include an affine transformation, including rotations, translations, scaling, and combinations thereof. The convolution stage computes outputs that are connected to specific regions in the input, for example, a dot product between the neuron's weights and the connected region in the local input. Output from the convolution stage (310) defines a set of linear activations that are processed by successive stages of the convolutional layer (304).

Each linear activation is processed by a non-linear activation function of the detector stage (312), for example, a rectified linear unit (ReLU). The activation function increases the nonlinear properties of the overall network without affecting the receptive fields of the convolution layer. Several types of non-linear activation functions may be used.

The pooling stage (314) replaces the output of the convolutional layer (306) with a summary statistic of the nearby outputs. Pooling can introduce translation invariance into the neural network, such that small translations to the input do not change the pooled outputs.

The output from the convolutional layer (304) can then be processed by the next layer (316). The next layer (316) can be an additional convolutional layer or one of the fully connected layers (308). The final convolutional layer of the network can generate output of a feature map data or provide input to a fully connected layer.

Referring back to FIG. 3A, output from the multiple convolutional layers may optionally be processed by a set of fully connected layers (306). The fully connected layers (306) have full connections to all activations in the previous layer, as in a feedforward network, such that every output unit interacts with every input unit. The output from the fully connected layers (306) can be used to generate an output result from the network, for example, to generate a classification value for the input to the CNN.

Figure 4:
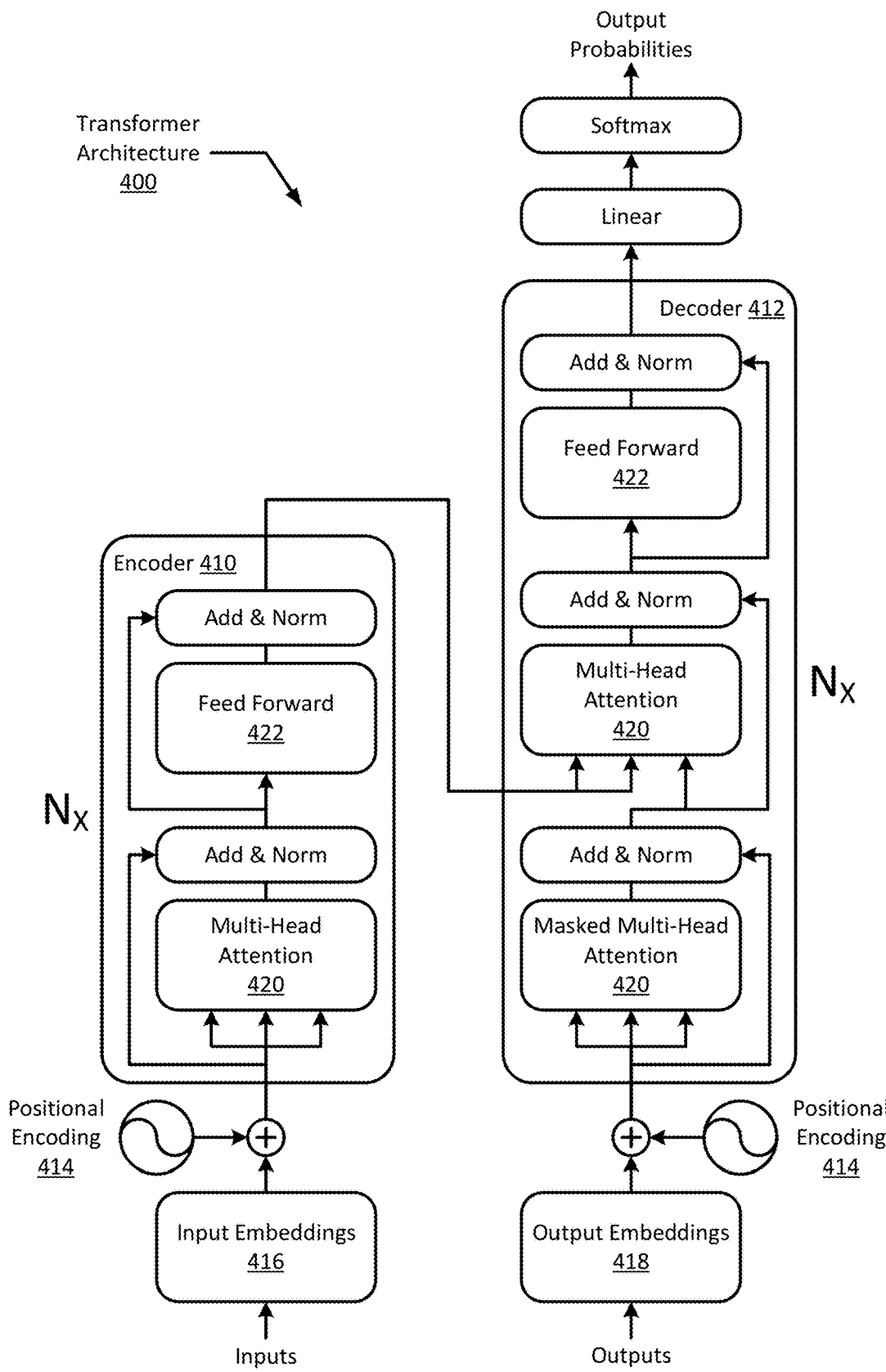
FIG. 4 illustrates a transformer architecture, in accordance with one or more embodiments.

FIG. 4 illustrates a transformer architecture. Transformer architecture (400) can be used to implement one or more machine learning models, such as transformer model (228) (222) of FIG. 2. The transformer, in comparison to recurrent neural networks (RNN), is less prone to suffering from the vanishing gradient problem which is characteristic of networks using gradient-based optimization techniques (i.e., reduced efficacy due to the earlier layers learning being slower than the learning of later layers due to temporal information decay).

The transformer architecture (400) relies on a self-attention (intra-attention) mechanism, thereby eliminating the recurrent operations computed in Recurrent Neural Networks, which may be used to compute the latent space representation of both the encoder (410) and decoder (412) sides. Positional encoding (414) is added to the input and output embeddings (416, 418) with the absence of recurrence. The positional information, which is similar to a time-step in a recurrent network, provides the Transformer network with the order of input and output sequences. A combination of absolute positional encoding and relative positional information may be used. Input from the previously generated symbol is auto-regressively used by the model for the next prediction which is organized as a stack of encoder-decoder networks. In addition, uniform layers compose both the encoder (410) and decoder (412), and each layer is built of two sublayers: a multi-head self-attention layer (420) and a position-wise feed-forward network (FFN) layer (422). The multi-head sub-layer (420) enables the use of multiple attention functions with an equivalent cost of utilizing attention, while the FFN sub-layer (422) uses a fully connected network to process the attention sublayers. The FFN applies multiple linear transformations on each position and a Rectified Linear Unit (ReLU) which extends the self-attention mechanism to efficiently consider representations of the relative positioning (i.e., distances between sequence elements). An efficient implementation of a relation-aware self-attention mechanism is, thus, achieved.

In one embodiment of the disclosure, the transformer architecture is a generative pretrained transformer model, such as OpenAI's GPT-3, Nvidia's Megatron-LM, or Microsoft's Turing-NLG, that utilize massive data sets and scaling of the transformer architecture. For example, the GPT-3 training data set includes results from a massive web crawl. This volume of data allows the expansion of GPT-3 to 175 billion parameters using 96 attention layers, each with a 96×128 dimension head, enabling few or zero-shot training paradigms. By prompting the model with a few response paradigms, the GPT-3 model understands the context, produces results, and can structure its response automatically, without any parameter retraining.

While FIGS. 1-4 show a configuration of components, other configurations may be used without departing from the scope of the invention. For example, various components may be combined to create a single component. As another example, the functionality performed by a single component may be performed by two or more components.

Figure 5:
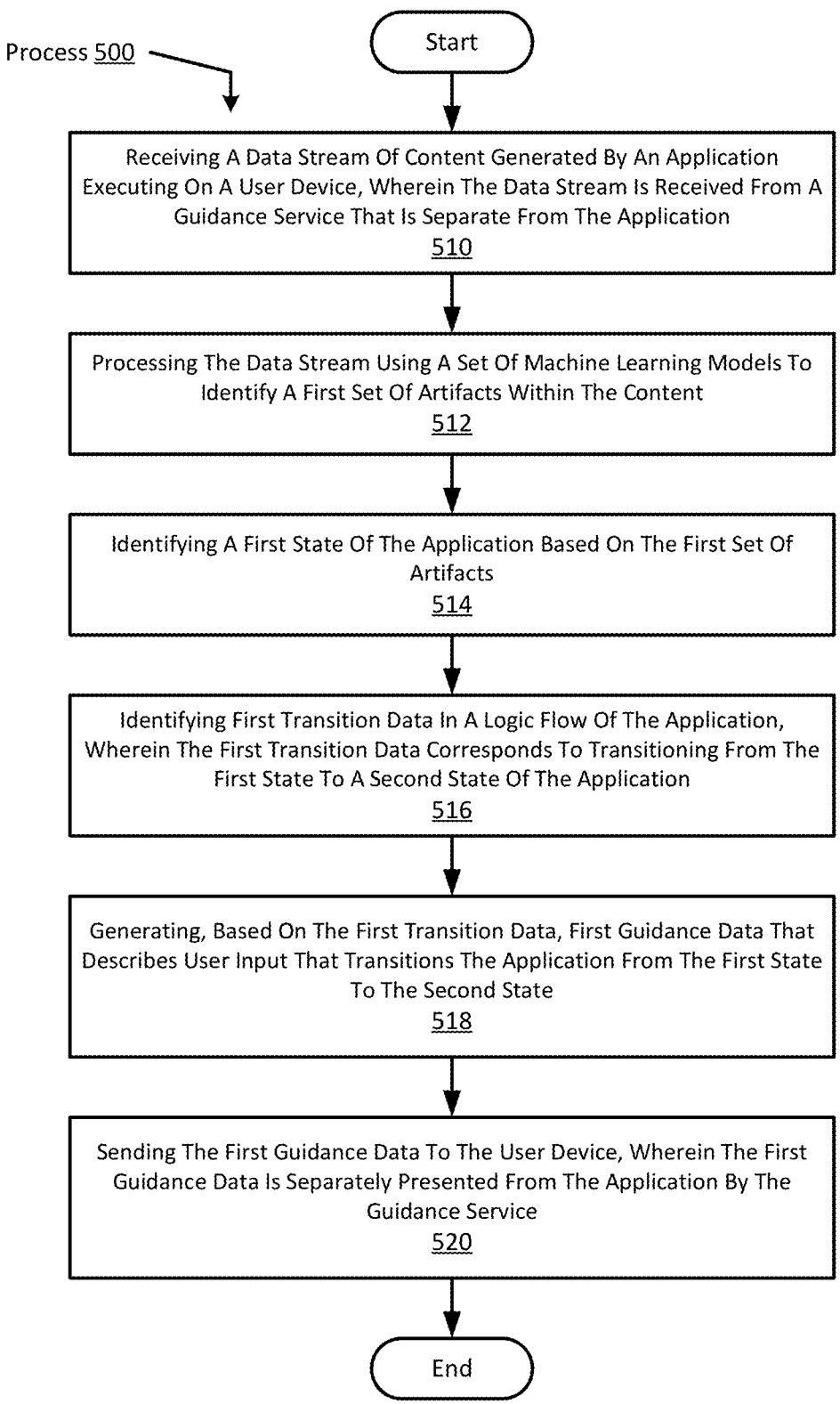
FIG. 5 shows a flowchart of a process 500 in accordance with one or more embodiments.

FIG. 5 shows a flowchart of the process (500) in accordance with the disclosure. The process (500) of FIG. 5 provides voice guidance over live media for out-of-band applications. The embodiment of FIG. 5 may be combined and may include or be included within the features and embodiments described in the other figures of the application. The features of FIG. 5 are, individually and as an ordered combination, improvements to the technology of computing systems and streaming media systems. While the various steps in this flowchart are presented and described sequentially, one of ordinary skill will appreciate that some or all the steps may be executed in different orders, may be combined, or omitted, and some or all the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Accordingly, embodiments should not be considered limited to the specific number and arrangement of blocks shown in FIG. 5. FIG. 5 provides a general overview of one or more embodiments.

At step 510, a data stream is received that comprises content generated by an application executing on a user device. The data stream can be received by a guidance controller, such as guidance controller (104). The data stream may comprise a multimedia "screen share" of content being displayed on a local user's screen, and may include an entirety or a portion of a display screen and/or file being displayed, as well as user cursor navigation and other user interface operations on the file(s).

The data stream is received from a guidance service that is separate from the application. In other words, the processes of the application are not owned by the guidance service. Therefore, in some embodiments, the guidance service may not have access to the underlying data structures that support the application, such as a cascading style sheet (CSS) and/or document object model (DOM). In some embodiments, the guidance service may not be able to observe changes and/or mutations to the underlying data structures.

At step 512, the images are processed using a set of machine learning models to identify a first set of artifacts within the images. According to embodiments of the disclosure, the first set of artifacts can be identified within the images using one or more different machine learning models, including models selected from an optical character recognition model, a convolutional neural network, a transformer model, or combinations thereof.

At step 514, a first state of the application is identified based on the first set of artifacts. For example, a database can be indexed according to artifacts that can be identified from the application images. the artifacts that are identified by the machine learning models can be used to query the database and determine the first state of the application.

In other embodiments, artifacts are stored in an attribute graph organizing application states based on the display and arrangement of artifacts for that state. An attribute graph is a nonhierarchical general graph in which each node is for an artifact or an application state. A link exists between a state node and an artifact node based on whether the state includes the particular artifact. Each artifact node may be connected to multiple state nodes. Namely, a link may exist from an artifact to each state node that has the artifact. Thus, by selecting an artifact, states having the artifact may be identified.

In some embodiments, links between states and artifact nodes may have a probability value that represents a likelihood that the state is correctly determined given the artifact. Thus, in one or more embodiments, the attribute graph may also maintain the degree of certainty of the application state given the identified artifacts.

The attribute graph is a type of data structure, or storage structure for data, that may be used to store file attribute values for files. Other types of data structures may be used without departing from the scope of the disclosure. Such other types of data structures include databases, indexes into the file system, tree structures based on files rather than file attributes, and other structures.

Returning now to step 516, first transition data is identified in a logic flow of the application. The first transition data corresponds to transitioning from the first state to a second state of the application.

For example, the logic flow may be configured to store application states and transitions as a directed graph. Each node of the graph corresponds to an application state. Edges connecting the nodes represent data for transitioning the application between the different states of the corresponding nodes. Thus, a path may be traversed between states of the application according to the transitional data in the sequence of edges that connect the states.

At step 518, based on the first transition data, first guidance data is generated. According to one or more embodiments, the first guidance data can be generated using one or more machine learning models, for example, a large language machine learning model such as generative pre trained transformer model.

The first guidance data describes user input that transitions the application from the first state to the second state. For example, the generative pretrained transformer machine learning model can be tuned using a series of prompt and expected completions. These prompts and completions provide the model with additional learnable embeddings which are directly prepended to the sequence at the embedding layers (416 and 418) in FIG. 4. The encoder (410) in FIG. 4 maps the input sequence to vector representations using a self-attention mechanism, with the learnable prompt embeddings being inserted at the first layer. The decoder (412) in FIG. 4 generates the text to classify the example based on the encoder representations, again using an attention mechanism, with the learnable completion embeddings being inserted at the last layer. Given a sufficient number of appropriate examples, the model will produce suggestions of a syntax similar to that of the examples prior. In other words, the format of the output depends on the syntax of the example prompts and completions, enabling the model to produce syntactically similar completions when presented with different prompts.

At step 520, the first guidance data is sent to the user device. The guidance service presents the first guidance data on the user device separately from the application. According to some embodiments, the first guidance data is presented as at least one selected from the group consisting of voice guidance and visual cues.

For example, the guidance service may overlay the guidance data onto a display of the application in real time on the client device. Similarly, the guidance service may generate audio signals, using a text to speech engine, based on data received from the guidance controller.

In some embodiments, the guidance service may validate that user input complies with the guidance data by determining subsequent states for the application. For example, using the set of machine learning models, subsequently received content can be processed to identify a second set of artifacts. Based on the second set of artifacts, the process can identify a current (i.e., third) state of the application, and then determining whether the third state matches the second state that was anticipated according to the logic flow.

If the third state does not match the second state, the process can generate second guidance data for reverting the application from the second state back to the first state. Alternatively, if a transition from the third state to the second state is defined within the logic flow, the process can identify transition data guidance data that describes user input for transitioning the application from the third state to the second state While the various steps in the flowchart are presented and described sequentially, at least some of the steps may be executed in different orders, may be combined, or omitted, and at least some of the steps may be executed in parallel. Furthermore, the steps may be performed actively or passively.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processors (602), non-persistent storage (604), persistent storage (606), a communication interface (612) (e.g., Bluetooth interface, infrared interface, network interface, optical interface, etc.), and numerous other elements and functionalities that implement the features and elements of the disclosure. The computer processor(s) (602) may be an integrated circuit for processing instructions. For example, the computer processor(s) may be one or more cores or micro-cores of a processor. The input devices (610) may include a touchscreen, keyboard, mouse, microphone, touchpad, electronic pen, or any other type of input device. The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the output devices (608) may include a display device, a printer, external storage, or any other output device. One or more of the output devices may be the same or different from the input device(s). The input and output device(s) may be locally or remotely connected to the computer processor(s) (602). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (600) in FIG. 6A may be connected to or be a part of a network. For example, as shown in FIG. 6B, the network (620) may include multiple nodes (e.g., node X (622), node Y (624). Each node may correspond to a computing system, such as the computing system shown in FIG. 6.1, or a group of nodes combined may correspond to the computing system shown in FIG. 6A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (600) may be located at a remote location and connected to the other elements over a network.

The nodes (e.g., node X (622), node Y (624)) in the network (620) may be configured to provide services for a client device (626), including receiving requests and transmitting responses to the client device (626). For example, the nodes may be part of a cloud computing system. The client device (626) may be a computing system, such as the computing system shown in FIG. 6A. Further, the client device (626) may include and/or perform all or a portion of one or more embodiments of the invention.

The computing system of FIG. 6A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. A method comprising:
    receiving a data stream of content generated by an application executing on a user device, wherein the data stream is received from a guidance service that is separate from the application;
    processing the data stream using a set of machine learning models to identify a first set of artifacts within the content;
    identifying a first state of the application based on the first set of artifacts;
    identifying first transition data in a logic flow of the application, wherein the first transition data corresponds to transitioning from the first state to a second state of the application;
    generating, based on the first transition data, first guidance data that describes user input that transitions the application from the first state to the second state; and
    sending the first guidance data to the user device, wherein the first guidance data is separately presented from the application by the guidance service.

2. The method of claim 1, further comprising:
    processing the data stream using the set of machine learning models to identify a second set of artifacts within the content; and
    identifying a third state of the application based on the second set of artifacts.

3. The method of claim 2, further comprising:
    determining whether the third state matches the second state;
    in response to determining that the third state does not match the second state, generating second guidance data that describes user input that transitions the application from the second state to the first state; and
    sending the second guidance data to the user device, wherein the second guidance data is separately presented from the application by the guidance service.

4. The method of claim 2, further comprising:
    identifying second transition data in the logic flow of the application, wherein the second transition data corresponds to transitioning from the third state to the second state of the application;
    generating, based on the second transition data, second guidance data that describes user input that transitions the application from the third state to the second state; and
    sending the second guidance data to the user device, wherein the second guidance data is separately presented from the application by the guidance service.

5. The method of claim 1, wherein the logic flow comprises a finite state machine.

6. The method of claim 1, wherein the first set of artifacts is identified within the content using the set of machine learning models consisting of at least one of an optical character recognition model, an object model, or combinations thereof.

7. The method of claim 1, wherein identifying the first state of the application further comprises:
querying a database indexed according to the artifacts to identify the first state.

8. The method of claim 1, wherein the first guidance data is presented on the user device as at least one selected from the group consisting of voice guidance and visual cues.

9. The method of claim 1, wherein generating the first guidance data further comprises:
generating the first guidance data from the first transition data using a large language machine learning model.

10. A system comprising:
a computer processor;
memory; and
instructions stored in the memory and executable by the computer processor to cause the computer processor to perform operations, the operations comprising:
receiving a data stream comprising content generated by an application executing on a user device, wherein the data stream is received from a guidance service that is separate from the application;
processing the data stream using a set of machine learning models to identify a first set of artifacts within the content;
identifying a first state of the application based on the first set of artifacts;
identifying first transition data in a logic flow of the application, wherein the first transition data corresponds to transitioning from the first state to a second state of the application;
generating, based on the first transition data, first guidance data that describes user input that transitions the application from the first state to the second state; and
sending the first guidance data to the user device, wherein the first guidance data is separately presented from the application by the guidance service.

11. The system of claim 10, further comprising:
processing the data stream using the set of machine learning models to identify a second set of artifacts within the content; and
identifying a third state of the application based on the second set of artifacts.

12. The system of claim 11, further comprising:
determining whether the third state matches the second state;
in response to determining that the third state does not match the second state, generating second guidance data that describes user input that transitions the application from the second state to the first state; and
sending the second guidance data to the user device, wherein the second guidance data is separately presented from the application by the guidance service.

13. The system of claim 11, further comprising:
identifying second transition data in the logic flow of the application, wherein the second transition data corresponds to transitioning from the third state to the second state of the application;
generating, based on the second transition data, second guidance data that describes user input that transitions the application from the third state to the second state; and
sending the second guidance data to the user device, wherein the second guidance data is separately presented from the application by the guidance service.

14. The system of claim 10, wherein the logic flow comprises a finite state machine.

15. The system of claim 10, wherein the first set of artifacts is identified within the content using the set of machine learning models consisting of at least one of an optical character recognition model, an object model, or combinations thereof.

16. The system of claim 10, wherein identifying the first state of the application further comprises:
querying a database indexed according to the artifacts to identify the first state.

17. The system of claim 10, wherein the first guidance data is presented on the user device as at least one selected from the group consisting of voice guidance and visual cues.

18. The system of claim 10, wherein generating the first guidance data further comprises:
generating the first guidance data from the first transition data using a large language machine learning model.

19. A computer program product comprising non-transitory computer-readable program code that, when executed by a computer processor of a computing system, causes the computing system to perform the method of:
receiving a data stream comprising content generated by an application executing on a user device, wherein the data stream is received from a guidance service that is separate from the application;
processing the data stream using a set of machine learning models to identify a first set of artifacts within the content;
identifying a first state of the application based on the first set of artifacts;
identifying first transition data in a logic flow of the application, wherein the first transition data corresponds to transitioning from the first state to a second state of the application;
generating, based on the first transition data, first guidance data that describes user input that transitions the application from the first state to the second state; and
sending the first guidance data to the user device, wherein the first guidance data is separately presented from the application by the guidance service.

20. The computer program product of claim 19, further comprising:
processing the data stream using the set of machine learning models to identify a second set of artifacts within the content;
identifying a third state of the application based on the second set of artifacts;
determining whether the third state matches the second state; and
in response to determining that the third state does not match the second state, generating second guidance data that describes user input that transitions the application from the second state to the first state; and
sending the second guidance data to the user device, wherein the second guidance data is separately presented from the application by the guidance service.

* * * * *